United States Patent Office 3,362,985
Patented Jan. 9, 1968

3,362,985
1,1 - BIS(TRIFLUOROMETHYL) - 2,3,3 - TRIFLUORO-2 - PROPENE - 1 - OL AND LOWER ALKYL CARBAMATES
Everett E. Gilbert and Benjamin Veldhuis, Morristown, N.J., assignors to Allied Chemical Corporation, New York, N.Y., a corporation of New York
No Drawing. Filed Feb. 11, 1965, Ser. No. 431,978
3 Claims. (Cl. 260—482)

This invention relates to the new compound perfluorovinyl dimethyl carbinol and its N- lower alkyl carbamates and to a process for combating noxious insects therewith.

The new perfluorovinyl dimethyl carbinol of our invention, which can also be designated 1,1-bis(trifluoromethyl)-2,3,3-trifluoro-2-propene-1-ol, and its N- lower alkyl carbamates are useful as insecticides and nematocides and particularly as fumigants in the control of larvae and/or adults of many insects, including the common house fly (*Musca domestica*), the confused flour beetle (*Tribolium confusum*), black carpet beetle (*Attagenus piceus*), varied carpet beetle (*Anthrenus verbosci*), lesser meal worm and yellow meal worm, (*Tenebrio molitar*), and the like, and also of nematodes, e.g., *Panagrellus redivivus*.

The new compounds of our invention have the general formula

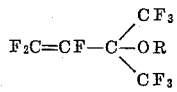

wherein R is a member selected from the group consisting of hydrogen and —CONHR¹ wherein R¹ represents a lower alkyl radical of 1 to 8 carbon atoms such as methyl, ethyl, propyl, butyl, pentyl, hexyl, heptyl, and octyl.

The new perfluorovinyl dimethyl carbinol of our invention has the formula

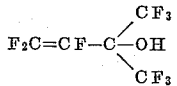

It can be prepared by the reaction of trifluoroethylene magnesium bromide with hexafluoro acetone followed by hydrolysis of the reaction product, according to the following equations:

I.

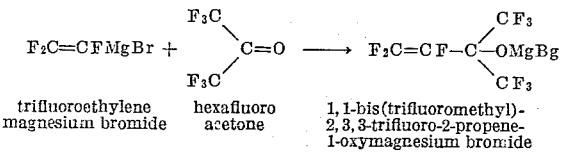

trifluoroethylene  hexafluoro   1,1-bis(trifluoromethyl)-
magnesium bromide  acetone     2,3,3-trifluoro-2-propene-
                                1-oxymagnesium bromide

II.

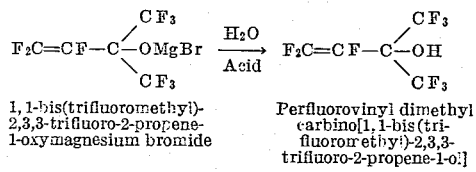

1,1-bis(trifluoromethyl)-          Perfluorovinyl dimethyl
2,3,3-trifluoro-2-propene-          carbinol[1,1-bis(tri-
1-oxymagnesium bromide              fluoromethyl)-2,3,3-
                                    trifluoro-2-propene-1-ol]

The trifluoroethylene magnesium bromide used in Reaction I is readily prepared by the known method of reacting trifluoroethylene bromide with magnesium metal in the presence of iodine in a reaction medium such as tetrahydrofuran.

In preparing the new perfluorovinyl dimethyl carbinol of our invention, hexafluoroacetone is added gradually, preferably as a gas, to a freshly prepared solution of the Grignard reagent, trifluoroethylene magnesium bromide, in a reaction medium solvent such as tetrahydrofuran, while maintaining the temperature of the mixture between about −50° C. and about +40° C. Reaction is usually complete upon completion of addition of hexafluoroacetone, usually a period of between about one and four hours. The resulting 1,1-bis(trifluoromethyl)-2,3,3-trifluoro-2-propene - 1-oxymagnesium bromide is hydrolyzed to the carbinol, preferably by first partially removing the major proportion of the reaction medium solvent as by distillation in vacuo, dispersing the resulting concentrate in an ammonium chloride solution to split off the Grignard complex and form the alcohol, then distilling to separate from high-boiling impurities, followed by separating the distillate into an oil layer (product) and an aqueous layer, aided if necessary by "salting out" with a salt such as NaCl. The oil layer is then dehydrated and purified, as by distillation from concentrated sulfuric acid at reduced pressure.

The resulting new perfluorovinyl dimethyl carbinol, i.e., the 1,1-bis(trifluoromethyl)-2,3,3-trifluoro-2-propene-1-ol is a colorless liquid boiling at about 67° C. It is readily converted to its N-alkyl carbamate derivatives by reaction with an alkyl isocyanate. Both the carbinol and its N-alkyl carbamates are effective insecticides and are especially effective as fumigants against numerous insects and their larvae, especially house flies and the grain infesting insects such as the various meal worms and flour beetles, as well as against nematodes (*Panagrellus redivivus*.)

Such insects or nematodes may be controlled and/or killed by subjecting them in any desired manner to the action of the perfluorovinyl dimethyl carbinol or its N-alkyl carbamates. A particularly preferred method of control is by fumigation, i.e., subjecting the insects and/or their larvae and nematodes to the action of vapors of the compound. Alternatively, the situs of the insects or their larvae or nematodes may be exposed to the compound in liquid form. For example, infested grain or soil may be exposed to either liquid or vapor form. Because of their high vapor pressures, they vaporize and permeate the entire charge or bin exerting their lethal effect on the pests therein. Wherever the term "insects" is used in the instant specification and claims, it is to be understood as referring to the insects in either adult or larvel form, and the term "nematodes" refers to either adult or larval form.

The following specific examples further illustrate our invention. Parts are by weight except as otherwise noted.

*Example 1*

A Grignard reagent was prepared by placing 6 grams of magnesium metal (0.25 mole), and a crystal of iodine in 200 ml. of tetrahydrofuran in a reaction vessel, and adding thereto 43.5 grams (0.25 mole) of gaseous trifluorobromoethylene over a period of 2 hours at 0° to 20° C. with mechanical stirring and external cooling, thus producing trifluoroethylene magnesium bromide. Then 50 grams (0.30 mole) of hexafluoroacetone gas was added with stirring at 0° to 10° C. over about 1 hour, thus producing the Grignard addition product 1,1-bis(trifluoromethyl)-2,3,3-trifluoro-2-propene - 1 - oxymagnesium bromide. The reaction mixture was then diluted with dibutyl ether and the major proportion of the tetrahydrofuran distilled off. The resulting solution was hydrolyzed to 1,1 - bis(trifluoromethyl) - 2,3,3-trifluoro-2-propene-1-ol by washing with dilute HCl. The product was distilled from the dibutyl ether and purified by distillation from 85% H₂SO₄ yielding a product boiling at 72°–74° C.

Example 2

The procedure of Example 1 was repeated using 85 grams (0.53 mole) of trifluorobromoethylene, 12 grams (0.5 mole) magnesium in 350 ml. of tetrahydrofuran to which was added 92 grams (0.55 mole) of gaseous hexafluoroacetone at −30° C. over a period of 3 hours. The mixture was allowed to stand overnight at room temperature (ca 25° C.) and was then distilled in vacuo to remove part of the tetrahydrofuran solvent, yielding 226 grams of residue which was mixed with a 25% aqueous solution of ammonium chloride to destroy the Grignard complex and form the alcohol. The resulting aqueous suspension was then distilled, and the distillate was separated into an oil layer and an aqueous layer by salting out using NaCl. The oil layer was then dehydrated and purified by distillation from 85% $H_2SO_4$ at 50° to 60° C. and 100 to 150 mm. pressure, resulting in 50 grams, a 40% yield, of pure 1,1-bis,trifluoromethyl)-2,3,3-trifluoro-2-propene-1-ol as indicated by the infrared absorption curve which exhibited a hydroxyl band at 2.7 microns and a band for the $F_2C=CF-$ group at 5.6 microns. The new compound was a colorless liquid boiling at about 67° C. and had the following analysis:

Calculated: F, 65.7%; H, 0.4%. Found: F, 66.2%; H, 0.5%.

Example 3

The 1,1 - bis(trifluoromethyl) - 2,3,3-trifluoro-2-propene-1-ol produced in Example 2 above was converted to its N-methyl carbamate as follows:

In a pressure vessel there were mixed 12.4 grams of 1,1 - bis(trifluoromethyl) - 2,3,3 - trifluoro-2-propene-1-ol, 3.1 grams of methyl isocyanate, 20 ml. of diisopropyl ether and 2 drops of triethyl amine. The mixture was heated on a steam bath for 13 hours by which time the reaction illustrated below was substantially complete as indicated by the infrared spectrum of the reaction mixture.

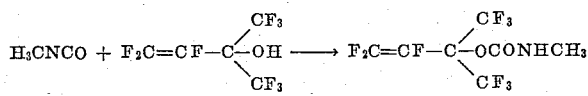

The solvent and unreacted starting materials were removed by distillation in vacuo yielding 11.3 grams of residue. The residue was recrystallized from hexane resulting in crystals melting at room temperature (ca 25° C.). The recrystallized product had an infrared absorption spectrum showing the $F_2C=CF-$ group at 5.6 microns, a carbonyl group at 5.76 microns and the —NH group at 2.9 microns indicating that the compound is the N-methyl carbamate of 1,1-bis(trifluoromethyl)-2,3,3-trifluoro-2-propene-1-ol.

The above N-methyl carbamate was tested as a fumigant against nematodes (*Panagrellus redivivus*) by placing 0.1 cubic centimeter of 1,1-bis(trifluoromethyl)-2,3,3-trifluoro-2-propene-1-N-methyl carbamate on a cellucotton wad in a 1 gallon jar. Small open petri dishes containing 100+ nematodes in 5 ml. of distilled water were placed in the gallon jar and the jar was sealed. After 24 hours' exposure the nematode containers were removed. Mortality counts were made after this exposure, at which time all the worms were dead, indicating a 100% kill.

Example 4

The new compound 1,1-bis(trifluoromethyl)-2,3,3-trifluoro-2-propene-1-ol was tested as a fumigant against house fly pupae by placing 0.05 cubic centimeter of the new compound on a cellucotton wad on a one-gallon jar. Twenty-five house fly pupae, confined in vials stoppered with cellucotton were placed in each jar and the jar was sealed. A similar jar containing no toxicant was charged with the same number of house fly pupae. After 24 hours the test jars and control were examined for number of flies emerged and percent kill with results shown below:

| Compound | No. Flies Emerged | Percent Dead |
|---|---|---|
| 1,1-bis(trifluoromethyl)-2,3,3-trifluoro-2-propene-1-ol | 0 | 100 |
| No toxicant | 23 | 8 |

Example 5

The new compound, 1,1-bis(trifluoromethyl)-2-propene-1-ol was tested as a toxicant against various insects and larvae in a procedure similar to that described in Example 4 above except that dosages of 0.1 cc. of the toxicant per gallon jar were used and the organisms were provided with food. Exposure to the toxicant was maintained for 24 hours and the organisms then examined for percent mortality with the results shown below:

| Organism: | Percent mortality after 24 hours' exposure |
|---|---|
| Confused flour beetle (adults) | 100 |
| Lesser meal worm | 100 |
| Black carpet beetle (larvae) | 100 |
| Yellow meal worm (larvae) | 100 |
| No toxicant | 0 |

Example 6

In a test similar to that described in Example 5 above, 1,1-bis(trifluoromethyl)-2-propene-1-ol was tested as a fumigant against nematodes (*Panagrellus redivivus*) by placing the nematodes in 5 ml. of distilled water in containers in a gallon jar containing 0.05 cubic centimeter of test compound on a cellucotton wad. After 24 hours' exposure the nematodes were removed, and mortality counts were made immediately. All the nematodes were found dead, indicating 100% mortality, even at the indicated low concentration of toxicant.

While the above describes the preferred embodiments of our invention, it will be understood that departures may be made therefrom within the scope of the specification and claims.

We claim:

1. As new compositions of matter, compounds of the formula

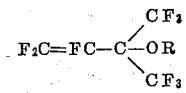

wherein R is a member selected from the group consisting of hydrogen and —$CONHR^2$ wherein $R^1$ represents a lower alkyl radical.

2. As a new compound, perfluorovinyl dimethyl carbinol of the formula

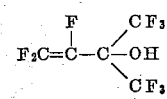

3. As a new compound, the N-methyl carbamate of perfluorovinyl dimethyl carbinol of the formula

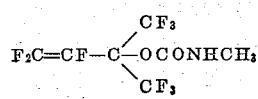

References Cited

UNITED STATES PATENTS

| | | | |
|---|---|---|---|
| 2,959,611 | 11/1960 | Nelson et al. | 260—482 XR |
| 3,080,405 | 3/1963 | Larsen et al. | 260—487 XR |
| 3,324,187 | 6/1967 | Litt et al. | 260—633 |

OTHER REFERENCES

Haszeldine, J. Chem. Soc. (1953), pp. 1748–1752.
Hatch, Chem. Ab. vol. 47 (1953), p. 12213h.

LORRAINE A. WEINBERGER, *Primary Examiner*.
A. P. HALLUIN, *Assistant Examiner*.

UNITED STATES PATENT OFFICE
CERTIFICATE OF CORRECTION

Patent No. 3,362,985　　　　　　　　　　　　　　　　January 9, 1968

Everett E. Gilbert et al.

It is hereby certified that error appears in the above numbered patent requiring correction and that the said Letters Patent should read as corrected below.

Column 1, lines 50 to 53, the right-hand formula should appear as shown below instead of as in the patent:

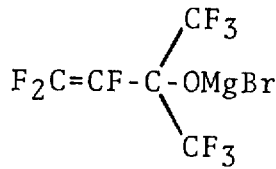

column 2, line 46, for "larvel" read -- larval --; column 3, line 52, for "5.76" read -- 5.75 --; column 4, lines 52 to 55, the formula should appear as shown below instead of as in the patent:

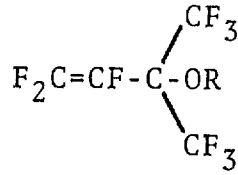

same column 4, line 59, for "-CONHR$^2$" read -- -CONHR$^1$ --.

Signed and sealed this 25th day of February 1969.

(SEAL)
Attest:

EDWARD M. FLETCHER, JR.　　　　　　　　　　　EDWARD J. BRENNER
Attesting Officer　　　　　　　　　　　　　　Commissioner of Patents